US009729361B2

(12) United States Patent
Reddy

(10) Patent No.: US 9,729,361 B2
(45) Date of Patent: Aug. 8, 2017

(54) FRACTIONAL DELAY ESTIMATION FOR DIGITAL VECTOR PROCESSING USING VECTOR TRANSFORMS

(71) Applicant: Alcatel-Lucent USA Inc., Murray Hill, NJ (US)

(72) Inventor: Ajit K. Reddy, Cliffwood, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 354 days.

(21) Appl. No.: 14/475,066

(22) Filed: Sep. 2, 2014

(65) Prior Publication Data

US 2016/0062946 A1 Mar. 3, 2016

(51) Int. Cl.
*G06F 7/00* (2006.01)
*H04L 25/49* (2006.01)
*H04L 25/02* (2006.01)

(52) U.S. Cl.
CPC .......... *H04L 25/49* (2013.01); *H04L 25/0212* (2013.01)

(58) Field of Classification Search
None
See application file for complete search history.

(56) References Cited

U.S. PATENT DOCUMENTS

| 8,111,101 | B2 | 2/2012 | Brown et al. | |
|---|---|---|---|---|
| 2005/0286619 | A1* | 12/2005 | Haddadin | H04B 1/0003 375/222 |
| 2006/0182193 | A1* | 8/2006 | Monsen | H04L 25/03057 375/267 |
| 2007/0018722 | A1 | 1/2007 | Jaenecke | |
| 2007/0189431 | A1* | 8/2007 | Waheed | H03C 3/0991 375/376 |
| 2008/0218262 | A1 | 9/2008 | Ziegler et al. | |
| 2008/0228292 | A1 | 9/2008 | Reddy | |
| 2008/0285640 | A1 | 11/2008 | McCallister | |
| 2016/0253288 | A1 | 9/2016 | Reddy | |

OTHER PUBLICATIONS

Mattias Olsson et al., "Time-Delay Estimation Using Farrow-based Fractional-Delay Fir Filters: Filter Approximation vs. Estimation Errors", 14th European Signal Processing Conference (EUSIPCO 2006), Sep. 4-8, 2006, 5 pages.

(Continued)

*Primary Examiner* — Michael D Yaary
(74) *Attorney, Agent, or Firm* — Davidson Sheehan LLP

(57) ABSTRACT

A fractional delay estimation module estimates a delay of a section of a forward processing path between a first point and a second point. The fractional delay estimation component determines an integer component and a fractional component of a first path delay based on a transform of a first vector inserted into the forward processing path at the first point and based on a transform of a first feedback vector received from a feedback path, determines an integer component and a fractional component of a second path delay in the forward processing path based on a third transform of a third vector inserted into the forward processing path at the second point and based on a fourth transform of a second feedback vector received from the feedback path, and further determines the estimated delay of the section based on a difference between the first and second path delays.

20 Claims, 4 Drawing Sheets

(56) References Cited

OTHER PUBLICATIONS

"Digital Predistortion", Altera, <http://www.altera.com/end-markets/wireless/advanced-dsp/predistortion/wir-digital-predistortion.html>, Accessed Sep. 2, 2014, 2 pages.
International Search Report and Written Opinion correlating to PCT/US2016/018369 dated Jun. 21, 2016, 13 pages.
Shahabuddin Rahmania, et al., "Digital predistortion based on frequency domain estimation for OFDM systems with low complexity loop delay compensation", IEICE Electronics Express, vol. 9, No. 18, Jan. 1, 2012, 7 pages.
Mao-Ching Chiu, et al., "Predistorter Based on Frequency Domain Estimation for Compensation of Nonlinear Distortion in OFDM Systems", IEEE Transactions on Vehicular Technology, vol. 57, No. 2, Mar. 1, 2008, 11 pages.

\* cited by examiner

FRACTIONAL DELAY ESTIMATION FOR DIGITAL VECTOR PROCESSING USING VECTOR TRANSFORMS

BACKGROUND

Field of the Disclosure

The present disclosure relates generally to digital vector processing, and more specifically, to fractional delay estimation for digital vector processing.

Description of the Related Art

Digital signal processing components often introduce delays in the signals being processed as they traverse the forward processing path. In many instances, these delays can result in spurious or erroneous operation due to the resulting signal misalignment. To illustrate, many mixed signal systems employ digital pre-distortion to compensate for the non-linearity of a power amplifier or other non-linear front end device. However, the pre-distortion process typically relies on accurate signal alignment between the input signal and the pre-distortion signal, and thus such systems seek to characterize the time delay for the purposes of compensating for the time delay. Conventionally, the delay is estimated by computing the integer component of the delay using a windowing method, which provides a coarse resolution estimate of the location of a peak in the signal. The fractional component of the delay is then computed using a Farrow structure and fractional interpolation to search through the interpolated points for a finer-resolution estimate of the signal peak location. However, this conventional approach is computationally intensive in terms of time complexity. The precision of the fractional spacing is defined by the degree and number of taps in the Farrow structure, and the window used in the windowing method defines the maximum amount of delay that can be tracked for a given vector length. However, increasing window size for longer delays, or increasing the number and degree of taps in the Farrow structure, increases the computation time, and consequently power, which often is impracticable due to processing resource and power limitations.

SUMMARY OF EMBODIMENTS

The following presents a general, non-limiting summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In accordance with one aspect, a method includes determining, at a fractional delay estimation component of a system, an integer component and a fractional component of a first path delay introduced by a processing path of the system based on a transform of a first vector inserted into the processing path at an input of a section of the processing path and based on a transform of a first feedback vector received from a feedback path of the system and representing the first vector. The method further includes determining, at the fractional delay estimation component, an integer component and a fractional component of a second path delay in the processing path based on a third transform of a third vector inserted into the processing path at an output of the section of the processing path and based on a fourth transform of a second feedback vector received from the feedback path and representing the second vector. The method additionally includes estimating, at the fractional delay estimation component, a delay introduced by the section of the processing path based on a difference between the second path delay and the first path delay.

In accordance with another aspect, a system includes a forward processing path, a feedback path coupled to an output of the forward processing path, and a fractional delay estimation module to estimate a delay of a section of the forward processing path between a first point and a second point of the forward processing path. The fractional delay estimation component includes a path delay component to determine an integer component and a fractional component of a first path delay based on a transform of a first vector inserted into the forward processing path at the first point and based on a transform of a first feedback vector received from the feedback path and representing the first vector, and to determine an integer component and a fractional component of a second path delay in the forward processing path based on a third transform of a third vector inserted into the forward processing path at the second point and based on a fourth transform of a second feedback vector received from the feedback path and representing the second vector, and a net delay component to determine the estimated delay of the section based on a difference between the second path delay and the first path delay.

In accordance with yet another aspect, a non-transitory computer readable storage medium embodies a set of instructions. The set of instructions manipulate at least one processor to determine an integer component and a fractional component of a first path delay introduced by a processing path of the system based on a transform of a first vector inserted into the processing path at an input of a section of the processing path and based on a transform of a first feedback vector received from a feedback path of the system and representing the first vector. The set of instructions further manipulate at least one processor to determine an integer component and a fractional component of a second path delay in the processing path based on a third transform of a third vector inserted into the processing path at an output of the section of the processing path and based on a fourth transform of a second feedback vector received from the feedback path and representing the second vector. The set of instructions also manipulate at least one processor to estimate a delay introduced by the section of the processing path based on a difference between the second path delay and the first path delay.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
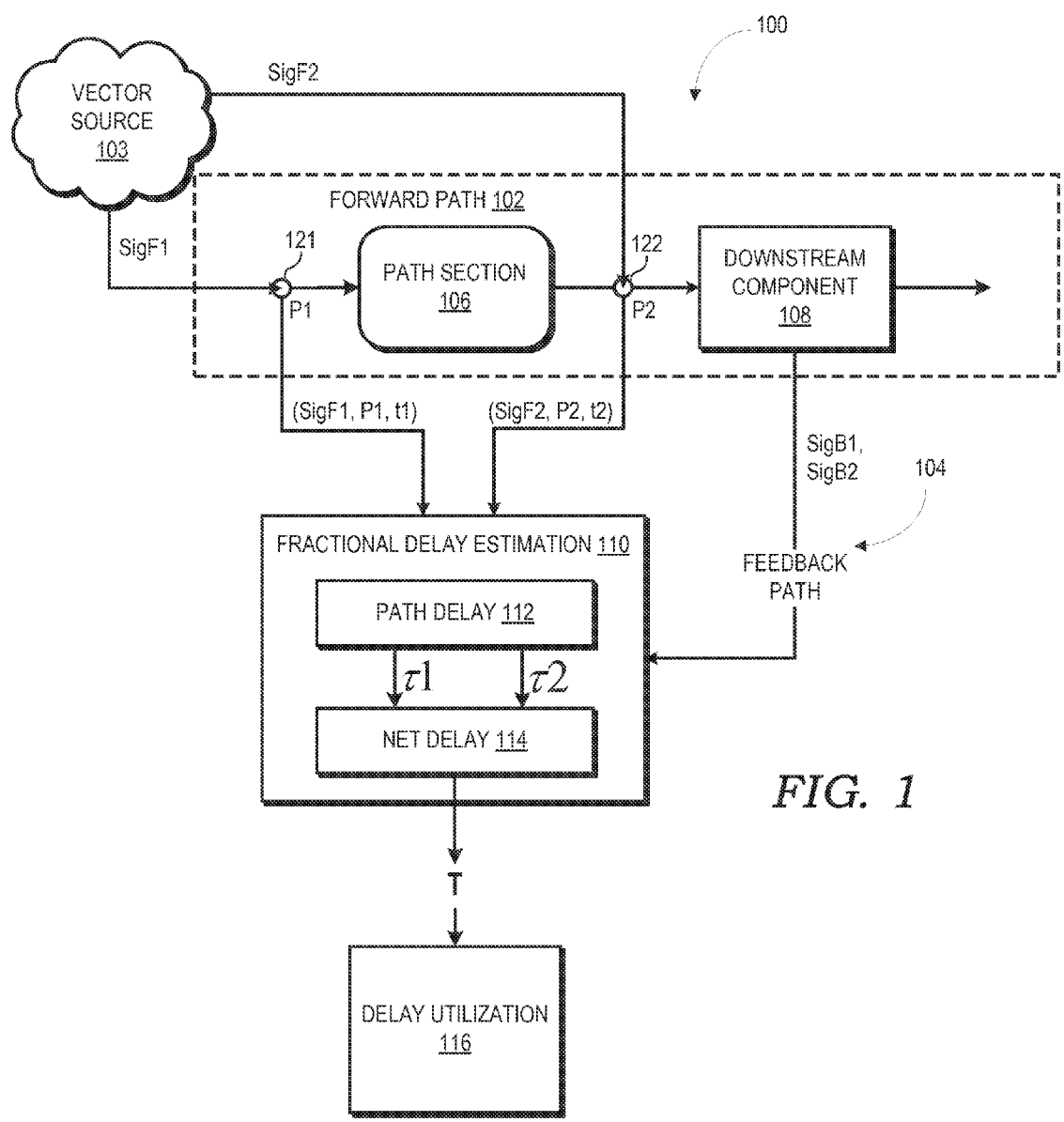
FIG. 1 is a block diagram illustrating a vector processing system employing a fractional delay estimation component in accordance with some embodiments.

FIGS. 1-4 illustrate example systems and techniques for accurate estimation of the delay introduced by a section of a signal processing path. In at least one embodiment, two forward vectors are inserted into the signal processing path, one at a point prior to, or "upstream" of the section, and one at a point subsequent to, or "downstream" of the section. A feedback path returns two feedback vectors, each one in response to a corresponding one of the inserted forward vectors. A fractional delay estimation component determines a first path delay for the first forward vector based on vector transformations of the first forward vector and corresponding feedback vector, the first path delay having an integer component and fractional component that are separately determined. The fractional delay estimation component likewise determines a second path delay for the second forward vector based on vector transformations of the second forward vector and corresponding feedback vector. Like the first path delay, the second path delay has an integer component and a fractional component that are separately determined. As the first path delay differs from the second path delay in that it additionally includes the delay contributed by the section of the signal processing path, the fractional delay estimation component then may estimate the delay contributed by the section based on the difference between the second path delay and the first path delay.

The vector data processed in the described manner can include, for example, signal vector data, whereby the section being characterized can include, for example, one or more digital vector signal processing components that feed into an analog or radio frequency (RF) front end component, such as a pre-distortion component that introduces digital pre-distortion into a transmitted signal to compensate for the non-linearity of the front end component. The vector data instead may include other vector types, such as digital statistical data, and may be real or complex vectors. For bi-directional signal transmission implementations, the techniques described herein may be implemented in either time division duplex (TDD) or frequency division duplex (FDD) systems.

The path delay estimation process described in detail below is relatively less complex than conventional approaches utilizing windowing and Farrow structures, while offering a high degree of precision. The speed and precision afforded by the disclosed process eliminates the need for faster and more complex analog-to-digital converters (ADCs) and digital-to-analog converters (DAC) as would be required by conventional approaches to achieve the same precision. Additionally, because of the reduced computational complexity, fewer processing resources (and thus less power) are required to implement the described delay estimation process. Moreover, because the delay estimation process is independent of the particular vectors used in the process, the delay estimation process may be implemented using normal data traffic and thus does not require the injection of special sequences or other separate calibration vectors.

FIG. 1 illustrates an example vector processing system 100 employing transform-based fractional delay estimation in accordance with at least one embodiment of the present disclosure. In the depicted example, the system 100 includes a forward path 102 for processing vector data from a vector source 103, and a feedback path 104 for providing feedback vector data from an output of the forward processing path 102. The vector source 103 can comprise any of a variety of sources of digital vector data, such as processing components of user equipment or a base station that provide data for transmission to a receiving device, a data store storing a digital statistical data set, and the like.

The forward path 102 comprises a series of one or more sub-paths for processing digital vector data, such as processing digital vector data for analog transmission. To this end, the forward path 102 includes a path section 106 that includes one or more digital vector processing components and one or more components 108 that are downstream of the path section 106 in the forward path 102. The one or more components 108 thus are referred to herein as "downstream components 108." To illustrate, as described in greater detail below with reference to FIG. 4, the downstream component 108 may comprise a front end component, such as a radio frequency (RF) front end device or analog front end device that converts received digital vectors to a corresponding analog signal for wireless or wired transmission. In such an implementation, the path section 106 may include various vector processing components related to digital processing of the signal prior to digital-to-analog conversion and transmission, such as a pre-distortion component to insert pre-distortion to compensate for the non-linearity of the analog components of the front end device.

In the course of processing the digital vector data, the one or more components of the path section 106 typically introduce a delay into the resulting outputs due to the processing performed by these components. For example, in a pre-distortion implementation, the pre-distortion output generated by a pre-distortion component may be delayed relative to the corresponding signal with which it is to be combined due to the processing time spent generating the pre-distortion output. Accordingly, in order to ensure effective operation, the system 100 further includes a fractional delay estimation component 110 that operates to estimate the delay in the forward path introduced by the components of the path section 106. The fractional delay estimation component 110 may be implemented as hardcoded logic, as one or more processing components (e.g., a general purpose processor or digital signal processor) manipulated by executed software instructions to provide the functionality described herein, or a combination thereof. To illustrate, in one embodiment, the path section 106 and the fractional delay estimation component 110 may be implemented in the same digital signal processor. As another example, the path section 106 may be implemented in a digital signal processor and the fractional delay estimation component may be implemented in a separate hardware component, such as a field programmable gate array (FPGA).

In at least one embodiment, the fractional delay estimation component 110 estimates the delay introduced by the path section 106 by determining the difference between a fractional delay (denoted "$\tau 1$") of a path through the forward path 102 and the feedback path 104 that includes the path section 106 and a fractional delay (denoted "$\tau 2$") of the same path but without the path section 106. That is, the fractional delay estimation component 110 estimates the delay introduced by the path section 106 (denoted herein as delay "T") by determining the delay that the path section 106 contributes to a larger overall delay in a path that includes the path section 106, the downstream component 108, and the feedback path 104. To this end, the fractional delay estimation component 110 includes a path delay component 112 that determines the two path delays $\tau 1$ and $\tau 2$ as described herein, and a net delay component 114 that determines the delay T introduced by the path section 106 based on the difference of the two path delays $\tau1$ and $\tau2$.

The delay T is provided to one or more components of the system 100 that utilize the delay T or otherwise configure their operation based on the delay T (these components being referred to herein as "delay utilization components 116"). Although illustrated separately in FIG. 1, the delay utilization component 116 may be implemented as a component of the path section 106 or of the downstream component 108. The delay utilization component 116 can comprise, for example, a fractional delay (FD) filter to delay another signal so as to more closely align with a delayed signal output by the path section 106. For example, with reference to the aforementioned pre-distortion implementation, the delay T could be used to configure a FD filter to provide accurate signal alignment between the original signal and the pre-distortion signal. In other embodiments, the delay T may be utilized in processes used to locate components within a system (or identify falsely identified components within a system), locate components outside of a system (e.g., determine a location or distance of a user equipment relative to a wireless base station) or for other general distance computation processes, and the like.

Figure 2:
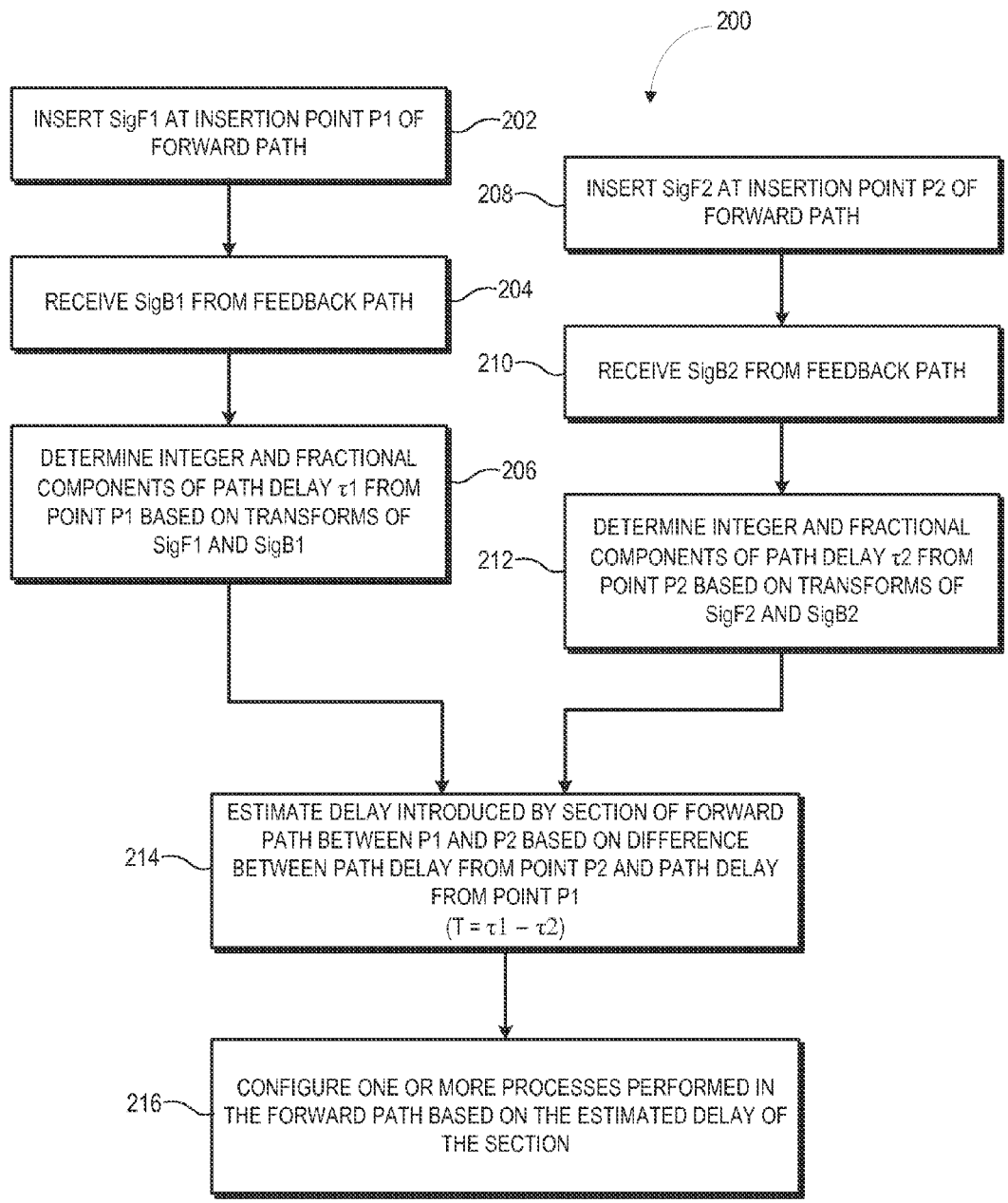
FIG. 2 is a flow diagram illustrating an example operation of the vector processing system of FIG. 1 for estimation of a time delay introduced by a section of a forward path based on transforms of forward vectors and corresponding feedback vectors in accordance with some embodiments.

FIG. 2 illustrates an example method 200 of operation of the system 100 of FIG. 1 for estimating the delay T of the path section 106 in accordance with some embodiments. As noted above, the delay estimation process implemented by the fractional delay estimation component 110 is predicated on determining two path delays: the path delay of a path including the path section 106 and the path delay of the path without the path section 106. To this end, at block 202 a digital vector SigF1 is inserted at time t1 at an insertion point P1 (also denoted as point 121 in FIG. 1) at an input of the path section 106 (that is, the point P1 is prior to, or "upstream" of, the path section 106) and the vector SigF1 is then processed by the components of the path section 106 and the one or more downstream components 108. As the vector SigF1 is processed by the forward path 102, it is also referred to herein as "forward vector." In at least one embodiment, the forward vector SigF1 is a normal vector generated from the vector source 103; that is, the vector SigF1 is a vector selected from a data stream supplied from the vector source 103, rather than a specific training or calibration sequence. In this case, the fractional delay estimation component 110 stores the vector SigF1 at a register, cache, or other local storage. To illustrate, in one embodiment, the fractional delay estimation component 110 stores a tuple of the vector, insertion time, and insertion point (e.g., the tuple (SigF1, t1, P1)). In other embodiments, the fractional delay estimation component 110 may generate a separate forward vector for insertion as the forward vector SigF1 at insertion point P1, although the delay estimation process is not influenced by the particular form of the forward vector. At block 204, the output of the forward path 102 generated from the processing of the forward vector SigF1 is fed back though the feedback path 104, and the resulting feedback vector SigB1 is received and stored by the fractional delay estimation component 110.

At block 206, the path delay component 112 uses the forward vector SigF1 and the corresponding feedback vector SigB1 to separately determine an integer component and a fractional component of the path delay $\tau1$ of the path from insertion point P1 through the remainder of the forward path 102 (including through the path section 106) and the feedback path 104. As will be appreciated, the integer component corresponds to that portion of the path delay $\tau1$ that is an integer multiple of the sampling period of the forward path 102, and the fractional component is the remaining fraction of the sampling period in the path delay $\tau1$.

Similarly, at block 208 a digital vector SigF2 is inserted at time t2 at an insertion point P2 (also denoted as point 122 in FIG. 1) at an output of the path section 106 (that is, the point P2 is subsequent to, or "downstream" of, the path section 106) and the vector SigF2 is then processed by the components of the one or more downstream components 108. As the vector SigF2 is processed by the forward path 102, it too is referred to herein as a "forward vector." As with the forward vector SigF1, the forward vector SigF2 may be a regular signal vector from a data stream output by the vector source 103, rather than a separate training or calibration vector. However, training or calibration vectors may be used in some embodiments. In at least one embodiment, the fractional delay estimation component 110 can cause the digital vector SigF2 to be inserted at the insertion point P2 by configuring the path section 106 or other portion of the forward path 102 to bypass the path section 106, such that the vector SigF2 is provided directly from point P1 to point P2 without processing by the path section 106. The fractional delay estimation component 110 stores the vector SigF2 at, for example, the tuple (SigF2, t2, P2)).

At block 210, the output of the forward path 102 generated from the processing of the forward vector SigF2 is fed back though the feedback path 104, and the resulting feedback vector SigB2 is received and stored by the fractional delay estimation component 110. At block 206, the path delay component 112 uses the forward vector SigF2 and the corresponding feedback vector SigB2 to separately determine an integer component and a fractional component of the path delay $\tau2$ of the path from insertion point P2 through the remainder of the forward path 102 (which excludes the path section 106) and the feedback path 104.

As described in greater detail below with reference to FIG. 3, in at least one embodiment the process for determining the integer and fractional components of the path delays $\tau1$ and $\tau2$ is based on the use of vector transforms of the forward vectors and corresponding feedback vectors. The described approach provides a high degree of precision with relatively low computational complexity, thereby reducing the processing resources needed to estimate the delay T of the path section 106 without requiring the use of higher speed ADCs and DACs.

With the path delays $\tau1$ and $\tau2$ calculated, at block 214 the net delay component 114 of the fractional delay estimation component 110 estimates the delay contributed by the path section 106 by determining the difference between the path delay $\tau1$ (representing a path having the path section 106) and the path delay $\tau2$ (representing the same path without the path section 106), that is, estimating the delay T as $\tau1-\tau2$. At block 216, the delay T of the path section 106 is provided to one or more delay utilization components 116, which, as noted above, configure the operation of one or more processes based on the indicated delay T.

Figure 3:
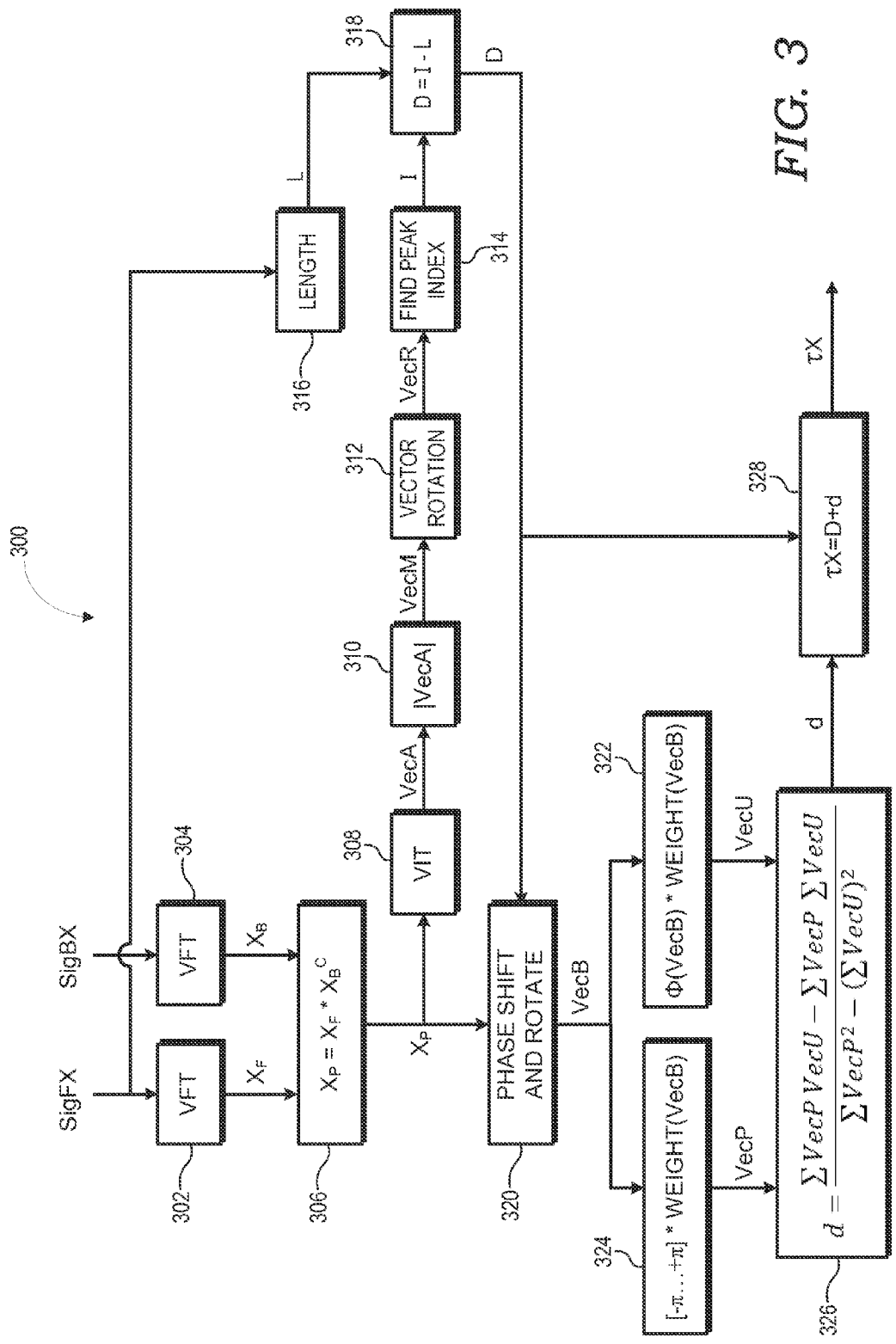
FIG. 3 is a diagram illustrating an example delay estimation process employed in the method of FIG. 2 in accordance with some embodiments.

FIG. 3 illustrates an example implementation of a path delay estimation process 300 performed by the path delay component 112 of the fractional delay estimation component 110 for determining the path delays $\tau1$ and $\tau2$ at blocks 206 and 212, respectively, of the method 200 shown in FIG. 2. As noted above, the fractional delay estimation component 110 stores the forward vector SigF1 and the corresponding feedback vector SigB1 as a vector pair. The fractional delay estimation component 110 also stores the forward vector SigF2-feedback vector SigB2 pair. The process described below is performed in the same manner for either the path delay τ1 or τ2 using the corresponding forward/feedback vector pair.

At block 302, the path delay component 112 computes a vector forward transform (VFT) of the inserted forward vector SigFX, with the resulting transform of SigFX referred to herein as vector $X_F$. Similarly, at block 304 the path delay component 112 computes the VFT of the corresponding feedback vector SigBX, with the resulting transform of SigBX referred to herein as vector $X_B$. Note that SigFX and SigBX refer to either SigF1 and SigB1 or SigF2 or SigB2, depending on whether it is path delay τ1 or path delay τ2 being calculated. In at least one embodiment, the VFT may be represented by either equation 1 or equation 2 below, depending on the characteristics of the particular vector. To illustrate, equation 1 may be utilized if the vectors are real vectors, whereas equation 2 may be utilized if the vectors are complex vectors. However, either equation 1 or equation 2 may be used in either real or complex vector implementations.

$$X(k) = \frac{1}{\sqrt{N}}\left[\sum_{m=0}^{\frac{N}{2}-1} x(2m)U_{N/2}^{2mk} + U_N^k \sum_{m=0}^{\frac{N}{2}-1} x(2m+1)U_{N/2}^{mk}\right] \quad \text{EQ. 1}$$

$$X(k) = \frac{1}{\sqrt{N}}\left[\sum_{m=0}^{\frac{N}{2}-1} x(2m)U_N^{2mk} + \sum_{m=0}^{\frac{N}{2}-1} x(2m+1)U_N^{(2m+1)k}\right] \quad \text{EQ. 2}$$

wherein X(k) represents a corresponding one of transform vectors $X_F$ or $X_B$, x( ) represents the corresponding one of SigFX or SigBX, N represents a number of samples in the corresponding vector, and U represents a transform kernel. Although particular examples of suitable transforms are illustrated by equations 1 and 2, the process is not limited to these examples. Instead, any of a variety of suitable transforms may be utilized in accordance with the teachings herein, such as wavelet-based transforms, a Hartley transform, a Gabor transform, and the like.

At block 306, the path delay component 112 calculates a product vector $X_P$ as the product of the transform vectors $X_F$ and $X_B$ as represented by equation 3:

$$X_P = X_F * X_B^C \quad \text{EQ. 3}$$

wherein $X_B^C$ is the conjugate of $X_B$.

At block 308, the path delay component 112 computes the vector inverse transform (VIT) of the transform vector $X_P$ to generate an inverse vector VecA (that is, VecA=VIT($X_P$)). In at least one embodiment, the VIT may be represented by either equation 4 or equation 5 below, with equation 4 employed as the VIT if equation 1 was employed as the VFT and with equation 5 employed as the VIT if equation 2 was employed as the VFT.

$$VecA(m) = \frac{1}{\sqrt{N}}\left[\sum_{k=0}^{\frac{N}{2}-1} X(2k)U_{N/2}^{-mk} + U_N^{-k}\sum_{k=0}^{\frac{N}{2}-1} X(2k+1)U_{N/2}^{-mk}\right] \quad \text{EQ. 4}$$

$$VecA(m) = \frac{1}{\sqrt{N}}\left[\sum_{k=0}^{\frac{N}{2}-1} X(2k)U_N^{-mk} + \sum_{k=0}^{\frac{N}{2}-1} X(2k+1)U_N^{-m(2k+1)}\right] \quad \text{EQ. 5}$$

At block 310, the path delay component 112 computes a magnitude vector VecM as the magnitude of the inverse vector VecA (that is, VecM=|VecA|). At block 312, the path delay component 112 rotates the magnitude vector VecM by half of its vector length to generate a rotated vector VecR.

At block 314, the path delay component 112 employs any of a variety of peak detection algorithms to detect the peak of the rotated vector VecR, as well as the index I of the sample in the rotated vector VecR corresponding to the peak. At block 316, the path delay component 112 determines the length L of the forward vector SigFX, and at block 318 the path delay component 112 subtracts the length L from the index I to determine the integer delay component (denoted "D") of the corresponding path delay.

At block 320, the path delay component 112 phase shifts the product vector $X_P$ by the integer component D determined at block 318 to generate a shifted vector $X_S$, and then rotates the shifted vector $X_S$ by the integer component D to generate a rotated vector VecB. At block 322, the path delay component calculates a weight vector VecU by multiplying the phase of the rotated vector VecB by the vector weight of the rotated vector VecB. That is, VecU=φ(VecB)*weight (VecB). At block 324, the path delay component 112 calculates a phase vector VecP by multiplying a vector containing values between −π and +π and having a vector length equal to the length of the weight vector VecU by the weight of the rotated vector VecB. That is, VecP=[−π . . . π]*weight (VecB).

At block 326, the path delay component 112 determines the fractional component "d" of the path delay based on application of a computation represented by equation 6 below using the weight vector VecU and the phase vector VecP:

$$d = \frac{\Sigma VecP VecU - \Sigma VecP \Sigma VecU}{\Sigma VecP^2 - (\Sigma VecU)^2} \quad \text{EQ. 6}$$

At block 328, the path delay component 112 determines the path delay τX (representing the corresponding one of τ1 or τ2) as the sum of the integer component D of the delay and the fractional component d of the delay. That is, τX=D+d. The process of blocks 302-328 may be repeated for each forward vector/feedback vector pair to obtain the path delays τ1 and τ2, at which point the net delay component 114 can determine the delay T of the path section 106 as T=τ1−τ2 as noted above.

Figure 4:
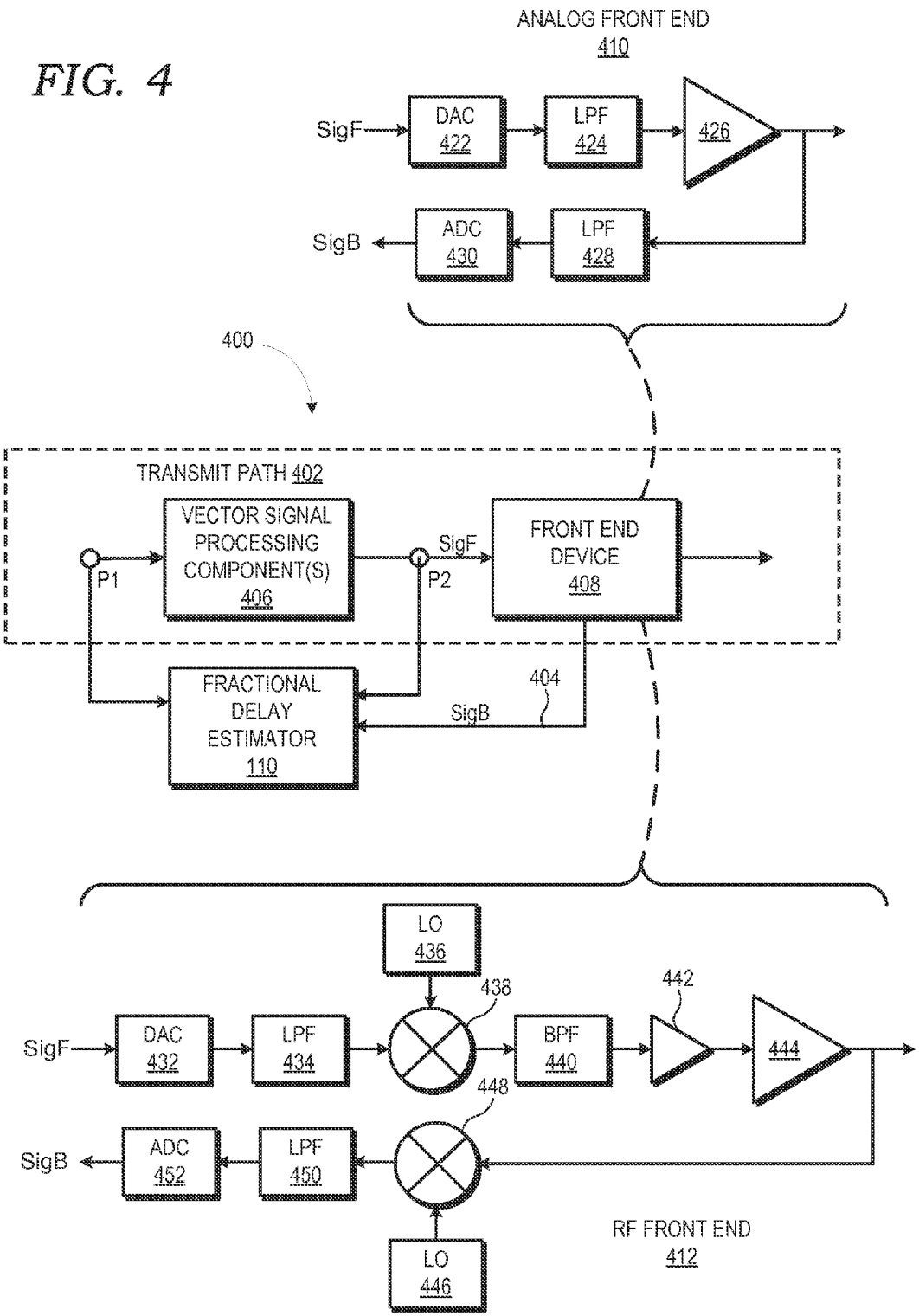
FIG. 4 is a diagram illustrating example implementations of the vector processing system of FIG. 1 in accordance with some embodiments.

FIG. 4 illustrates implementation of the system 100 in a data transmission system 400 in accordance with at least one embodiment. As described above, the delay estimation process can be effectively utilized to efficiently estimate the delay introduced at a section of any of a variety of vector processing paths. The delay estimation process finds particular benefit in mixed signal applications, such as digital transmission paths whereby digital vector data is subjected to digital processing before conversion to analog signaling for wireless or wired transmission to a receiver device. Thus, in the depicted example, the transmission path 402 of the data transmission system 400 represents the forward path 102, and a feedback path 404 of the data transmission system 400 represents the feedback path 104. The transmission path 402 includes one or more vector signal processing components 406 (corresponding to the path section 106) and a front end device 408.

The front end device 408 may be implemented as an analog front end 410 for wired signal transmission or a radio frequency (RF) front end 412 for wireless signal transmission. The analog front end 410 includes a transmit path comprised of, for example, a DAC 422, a low pass filter (LPF) 424, and a power amplifier 426, and a feedback path comprised of a LPF 428 and an ADC 430. The RF front end 412 includes a transmit path comprised of a DAC 432, a LPF 434, a local oscillator (LO) 436, a mixer 438, a bandpass filter (BPF) 440, a driver 442, and a power amplifier 444. The RF front end 412 also includes a feedback path comprised of a LO 446, a mixer 448, a LPF 450, and an ADC 452. For implementations utilizing complex vectors, the analog front end 410 or the RF front end 412 may implement the illustrated forward and feedback paths for each of the real and imaginary components of the complex vectors.

In operation, the vector signal processing components 406 perform pre-transmission processing of digital vectors before being provided to the front end device 408. To compensate for the delay introduced by this processing, the fractional delay estimation component 110 estimates the delay using the techniques described above, with the transmit path of the front end device 408 serving as a portion of the forward path 102 and the feedback path of the front end device 408 serving as part of the feedback path 104. As noted above, the fractional delay estimation process described herein provides a high degree of precision with relatively low computational complexity, thereby allowing for lower performance ADCs and DACs in the front end device 408 than otherwise would be required for the same precision using a conventional time delay estimation approach.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM), field programmable gate array (FPGA), or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining, at a fractional delay estimation component of a system, an integer component and a fractional component of a first path delay introduced by a processing path of the system based on a transform of a first vector inserted into the processing path at an input of a section of the processing path and based on a transform of a first feedback vector received from a feedback path of the system and representing the first vector;
   determining, at the fractional delay estimation component, an integer component and a fractional component of a second path delay in the processing path based on a third transform of a third vector inserted into the processing path at an output of the section of the processing path and based on a fourth transform of a second feedback vector received from the feedback path and representing the second vector; and
   estimating, at the fractional delay estimation component, a delay introduced by the section of the processing path based on a difference between the first path delay and the second path delay.

2. The method of claim 1, further comprising:
   performing, at the system, a signal alignment process based on the estimated delay.

3. The method of claim 2, wherein:
   performing, at the section of the processing path, a pre-distortion process to compensate for a non-linearity of a front end device of the processing path based on the signal alignment process.

4. The method of claim 1, further comprising:
   performing, at the system, a distance calculation process based on the estimated delay.

5. The method of claim 1, wherein:
determining the integer component of the first path delay comprises:
   determining a product vector based on a product the transform of the first vector and a conjugate of the transform of the first feedback vector;
   determining an inverse vector of the product vector based on an inverse transform of the product vector;
   determining a magnitude vector based on a magnitude of the inverse vector;
   determining a rotated vector based on a rotation of the magnitude vector by half of a vector length of the magnitude vector;
   determining an index in the rotated vector corresponding to an identified peak of the rotated vector; and
   determining the integer component of the first path delay based on a difference between a length of the first vector and the index.

6. The method of claim 5, wherein determining the transforms of the first vector and the first feedback vector comprises determining the transforms on the basis of a transform equation:

$$X(k) = \frac{1}{\sqrt{N}}\left[\sum_{m=0}^{\frac{N}{2}-1} x(2m)U_{N/2}^{mk} + U_N^k \sum_{m=0}^{\frac{N}{2}-1} x(2m+1)U_{N/2}^{mk}\right]$$

wherein X(k) represents a corresponding one of the transform of the first vector and the transform of the first feedback vector, x( ) represents a corresponding one of the first vector and the first feedback vector, N represents a number of samples in the corresponding one of the first vector and first feedback vector, and U represents a transform kernel.

7. The method of claim 6, wherein the inverse transform is represented by a transform equation:

$$VecA(m) = \frac{1}{\sqrt{N}}\left[\sum_{k=0}^{\frac{N}{2}-1} X(2k)U_{N/2}^{-mk} + U_N^{-k} \sum_{k=0}^{\frac{N}{2}-1} X(2k+1)U_{N/2}^{-mk}\right]$$

wherein VecA represents the inverse vector.

8. The method of claim 5, wherein determining the transforms of the first vector and the first feedback vector comprises determining the transforms on the basis of a transform equation:

$$X(k) = \frac{1}{\sqrt{N}}\left[\sum_{m=0}^{\frac{N}{2}-1} x(2m)U_N^{2mk} + \sum_{m=0}^{\frac{N}{2}-1} x(2m+1)U_N^{(2m+1)k}\right]$$

wherein X(k) represents a corresponding one of the transform of the first vector and the transform of the first feedback vector, x( ) represents a corresponding one of the first vector and the first feedback vector, N represents a number of samples in the corresponding one of the first vector and first feedback vector, and U represents a transform kernel.

9. The method of claim 8, wherein the inverse transform is represented by a transform equation:

$$VecA(m) = \frac{1}{\sqrt{N}}\left[\sum_{k=0}^{\frac{N}{2}-1} X(2k)U_N^{-2mk} + \sum_{k=0}^{\frac{N}{2}-1} X(2k+1)U_N^{-m(2k+1)}\right]$$

wherein VecA represents the inverse vector.

10. The method of claim 5, wherein determining the fractional component of the first path delay comprises:
   determining a shifted vector based on a phase shifting and rotation of the product vector by the integer component of the first path delay;
   determining a weight vector based on a product of a phase of the shifted vector and a weight of the shifted vector;
   determining a phase vector based on a product of a weight of the shifted vector and a vector containing values between −π and +π and having a vector length equal to a length of the weight vector; and
   determining the fractional component based on the weight vector and the phase vector.

11. The method of claim 10, wherein determining the fractional component based on the weight vector and the phase vector comprises:
   determining the fractional component based on an equation:

$$d = \frac{\Sigma VecP VecU - \Sigma VecP \Sigma VecU}{\Sigma VecP^2 - (\Sigma VecU)^2}$$

wherein d represents the fractional component of the first path delay, VecP represents the phase vector, and VecU represents the weight vector.

12. A system comprising:
a forward processing path;
a feedback path coupled to an output of the forward processing path; and
a fractional delay estimation module to estimate a delay of a section of the forward processing path between a first point and a second point of the forward processing path, the fractional delay estimation module comprising:
   a path delay component to determine an integer component and a fractional component of a first path delay based on a transform of a first vector inserted into the forward processing path at the first point and based on a transform of a first feedback vector received from the feedback path and representing the first vector, and to determine an integer component and a fractional component of a second path delay in the forward processing path based on a third transform of a third vector inserted into the forward processing path at the second point and based on a fourth transform of a second feedback vector received from the feedback path and representing the second vector; and
   a net delay component to determine the estimated delay of the section based on a difference between the first path delay and the second path delay.

13. The system of claim 12, wherein the forward processing path further comprises:
   a component to perform a signal alignment process based on the estimated delay.

14. The system of claim 13, wherein the forward processing path further comprises:
   a front end component; and a component to perform a pre-distortion process to compensate for a non-linearity of the front end component based on the signal alignment process.

15. The system of claim 12, wherein:
the forward processing path comprises an analog front end component;
the first and second vectors comprise first and second signal vectors to be transmitted via the analog front end component; and
the feedback path comprises a feedback path from an output of the analog front end component.

16. The system of claim 12, further comprising:
a component to provide a fractional delay filter based on the estimated delay.

17. The system of claim 12, wherein the path delay component is to determine the integer components of the first and second path delays by:
determining a product vector based on a product the transform of a corresponding one of the first vector and the second vector and a conjugate of the transform of the corresponding one of the first feedback vector and the second feedback vector;
determining an inverse vector of the product vector based on an inverse transform of the product vector;
determining a magnitude vector based on a magnitude of the inverse vector;
determining a rotated vector based on a rotation of the magnitude vector by half of a vector length of the magnitude vector;
determining an index in the rotated vector corresponding to an identified peak of the rotated vector; and
determining the integer component of a corresponding one of the first path delay and the second path delay based on a difference between a length of the corresponding one of the first vector and the second vector and the index.

18. The system of claim 17, wherein the path delay component is to determine the fractional components of the first and second path delays by:

determining a shifted vector based on a phase shifting and rotation of the product vector by the integer component of the corresponding one of the first path delay and the second path delay;
determining a weight vector based on a product of a phase of the shifted vector and a weight of the shifted vector;
determining a phase vector based on a product of the weight of the shifted vector and a vector containing values between $-\pi$ and $+\pi$ and having a vector length equal to a length of the weight vector; and
determining the fractional component of the corresponding one of the first path delay and the second path delay based on the weight vector and the phase vector.

19. A non-transitory computer readable storage medium embodying a set of instructions, the set of instructions to manipulate at least one processor to:
determine an integer component and a fractional component of a first path delay introduced by a processing path of a system based on a transform of a first vector inserted into the processing path at an input of a section of the processing path and based on a transform of a first feedback vector received from a feedback path of the system and representing the first vector;
determine an integer component and a fractional component of a second path delay in the processing path based on a third transform of a third vector inserted into the processing path at an output of the section of the processing path and based on a fourth transform of a second feedback vector received from the feedback path and representing the second vector; and
estimate a delay introduced by the section of the processing path based on a difference between the first path delay and the second path delay.

20. The non-transitory computer readable storage medium of claim 19, wherein the set of instructions further are to manipulate at least one processor to:
configure at least one process performed in the processing path based on the estimated delay.

* * * * *